(12) United States Patent
Limoges et al.

(10) Patent No.: US 7,174,404 B2
(45) Date of Patent: Feb. 6, 2007

(54) UPDATING SPIN COUNTERS FOR SPIN LATCHES

(75) Inventors: Joseph Serge Limoges, Etobicoke (CA); Dominque J. Evans, Toronto (CA); Matthew A. Huras, Ajax (CA); Russell M. Stocker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 10/290,384

(22) Filed: Nov. 7, 2002

(65) Prior Publication Data

US 2003/0182356 A1    Sep. 25, 2003

(30) Foreign Application Priority Data

Mar. 1, 2002    (CA) .................................. 2374290

(51) Int. Cl.
*G06F 12/00* (2006.01)
(52) U.S. Cl. ....................... 710/200; 711/158; 707/8
(58) Field of Classification Search ................ 710/200, 710/220; 707/8, 9; 718/103; 711/158
See application file for complete search history.

(56) References Cited

U.S. PATENT DOCUMENTS

| | | | |
|---|---|---|---|
| 5,666,523 A | | 9/1997 | D'Souza |
| 5,829,054 A | | 10/1998 | Ehlig et al. |
| 5,832,484 A | * | 11/1998 | Sankaran et al. .............. 707/8 |
| 5,987,258 A | | 11/1999 | Daniel et al. |
| 6,081,783 A | | 6/2000 | Divine et al. |
| 6,578,033 B1 | * | 6/2003 | Singhal et al. ................. 707/8 |

* cited by examiner

*Primary Examiner*—Rehana Perveen
*Assistant Examiner*—Clifford Knoll
(74) *Attorney, Agent, or Firm*—Stephen R. Tkacs; Stephen J. Walder, Jr.; Jeffrey S. LaBaw

(57) ABSTRACT

A spin counter updating system and method for updating spin counters for spin latches in a multiprocessor computing system. The updating system includes main spin counter value storage for storing spin counter data correlated to at least one spin counter value, and a master agent. The master agent includes agent spin counter value storage for storing spin counter data correlated to at least one spin counter value; and a spin counter signal handler, wherein the spin counter signal handler is adapted to read spin counter data from the main spin counter value storage and to store the read spin counter data to the agent spin counter value storage.

20 Claims, 5 Drawing Sheets

```
                    ┌─ 300
                    ↙

LATCH FUNCTION - Latch (resource name )

loop outer (outer value)

loop inner (inner value)

lock (resource name)

loop waste (waste value)

endloop waste endloop inner yield (resource name)

endloop outer
```

SPIN COUNTER SIGNAL HANDLER read main spin counter value data update agent spin counter value data exit( )

Fig. 4

UPDATING SPIN COUNTERS FOR SPIN LATCHES

FIELD OF THE INVENTION

This invention relates to the field of multiprocessor computing systems, and in particular to the updating of spin counters for spin latches.

BACKGROUND

In multiprocessor environments, such as ATM (automated teller machine) networks and other large-scale database systems, multiple processes or threads (in larger systems, numbering in the thousands) share processor time.

Typically, at its execution stage a process will be allotted a time slice or "quantum" of processing time on a processor. If the process is not completed within the quantum of time, context information reflecting the level of completion of the process will be stored, and the process will be put to the end of a queue (the "Run Queue") of processes awaiting access to a processor. This "context switch" itself consumes processing time, as data corresponding to the process being executed (including the context word, as will be understood) must be moved from the processor registers to main memory, typically RAM (random access memory), and another process must be moved from main memory to the process registers for subsequent execution by the processor.

In executing a process, a processor may require access to certain resources including I/O (input/output) devices and segments of memory. In the multi-processor context, conflicts between executing processes may arise if multiple processes require access to the same exclusive resource at the same time. Different techniques have been developed to address these types of process conflicts.

As a result of the processing expense of context switching, instead of simply generating a context switch if a process requires access to a resource which is already in use, one technique for resolving process conflicts involves the use of spin latches. Spin latches cause a processor to "spin" or loop in accordance with predetermined spin counter values, while the processor periodically checks to determine if the desired resource has become available.

In some instances, particularly in large-scale database systems, to optimize system performance it may be desirable to adjust spin counter values. However, generally this requires shutdown and reinitialization of a database system. For certain types of systems, such as banking systems, web servers and systems requiring operational capacity 24 hours a day, 7 days a week, shutting down the system is undesirable.

Accordingly, the inventors have recognized the need to provide a system and a method which addresses, at least in part, these and other shortcomings.

SUMMARY

An aspect of the present invention is directed towards a spin counter updating system for updating spin counters for spin latches in a multiprocessor computing system.

The spin counters updating system includes main spin counter value storage for storing spin counter data correlated to at least one spin counter value, and a master agent. The master agent includes agent spin counter value storage for storing spin counter data correlated to at least one spin counter value; and a spin counter signal handler, wherein the spin counter signal handler is adapted to read spin counter data from the main spin counter value storage and to store the read spin counter data to the agent spin counter value storage.

Another aspect of the present invention is further directed towards a program product stored on a computer readable medium. The program product includes a master agent. The master agent has agent spin counter value storage for storing spin counter data correlated to at least one spin counter value and a spin counter signal handler, wherein the spin counter signal handler is adapted to read spin counter data from the main spin counter value storage and to store the read spin counter data to the agent spin counter value storage.

Yet another aspect of the present invention is also directed towards a method of updating spin counters for spin latches in a multiprocessor computing system. The method includes:
  (a) providing a main spin counter value storage for storing spin counter data correlated to at least one spin counter value;
  (b) providing a master agent comprising:
    i) agent spin counter value storage for storing spin counter data correlated to spin counter values; and
    ii) a spin counter signal handler, wherein the spin counter signal handler is adapted to receive a signal call, and wherein upon receiving a signal call, the spin counter signal handler is adapted to read spin counter data from the main spin counter value storage and to store the read spin counter data to the agent spin counter value storage;
  (c) creating at least one child agent from the master agent wherein the child agent comprises the spin counter signal handler;
  (d) storing updated spin counter data in the main spin counter value storage; and
  (e) initiating a signal call to each spin counter signal handler.

BRIEF DESCRIPTION OF THE DRAWINGS

Embodiments of the present invention will now be described, by way of example only, with reference to the following drawings, in which like reference numerals refer to like parts and in which:

FIG. 3 depicts pseudocode of a typical spin latch function;

FIG. 4 depicts pseudo-code of a spin counter signal handler; and

DETAILED DESCRIPTION

Figure 1:
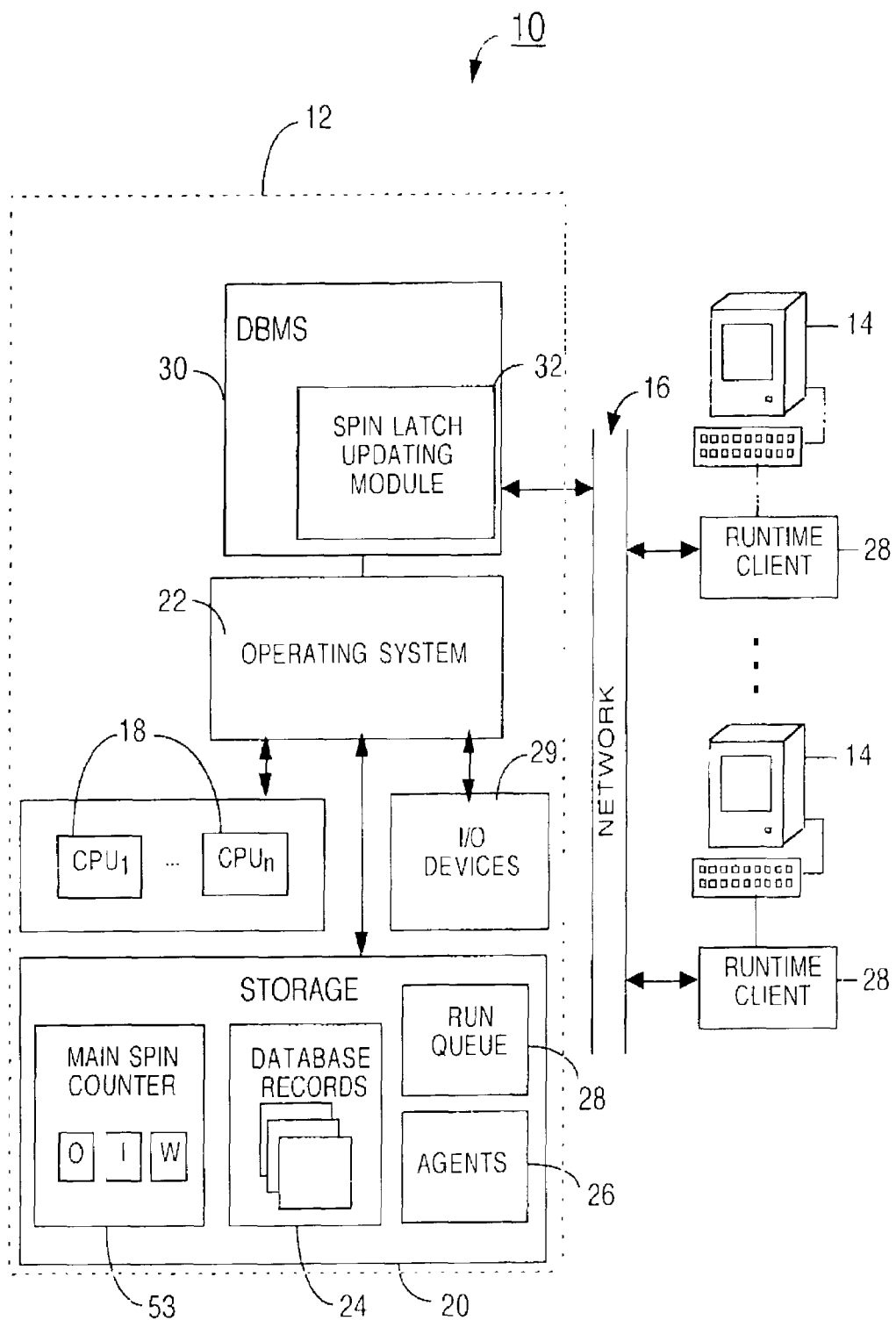
FIG. 1 is a schematic diagram of a multi-processor computing system comprising a spin counter updating system.

Referring to FIG. 1, illustrated therein is a multi-processor computing system, referred to generally as 10, made in accordance with an embodiment of the present invention. The computing system 10 comprises a multi-processor computer 12 which is linked to various (typically remote) terminals 14 via a network 16.

For example, the computing system 10 may form part of a banking system, with various ATMs (automated teller machines) as remote terminals 14. Also, for example, the computing system 10 may form part of a centralized database system with terminals 14 capable of accessing the data stored in the computer system 10.

The multiprocessor computer 12 includes software, hardware and firmware components, including a bank of central processor units (CPUs) 18, memory storage 20 (including RAM, ROM and long term storage), and operating system software 22 (typically stored in ROM) controlling the interaction of the various components of the computer 12. The memory storage 20 preferably stores data relating to database records 24, executable processes (also known as agents or dispatchable threads) 26 and a run queue 28 which contains links indexing to the executable processes data 26.

The computer 12 may also include I/O device components 29, such as printers and monitors. The computer 12 is also suitably programmed with a database management system (DBMS) 30 operatively coupled to the operating system 22, and including a spin latch updating module referred to generally as 32 adapted to dynamically update spin counter values, as will be explained in greater detail below.

Each terminal 14 generally includes a processor (including RAM and ROM) which is suitably programmed with a runtime client application program interface 28 adapted to communicate with the DBMS 30.

Figure 2:
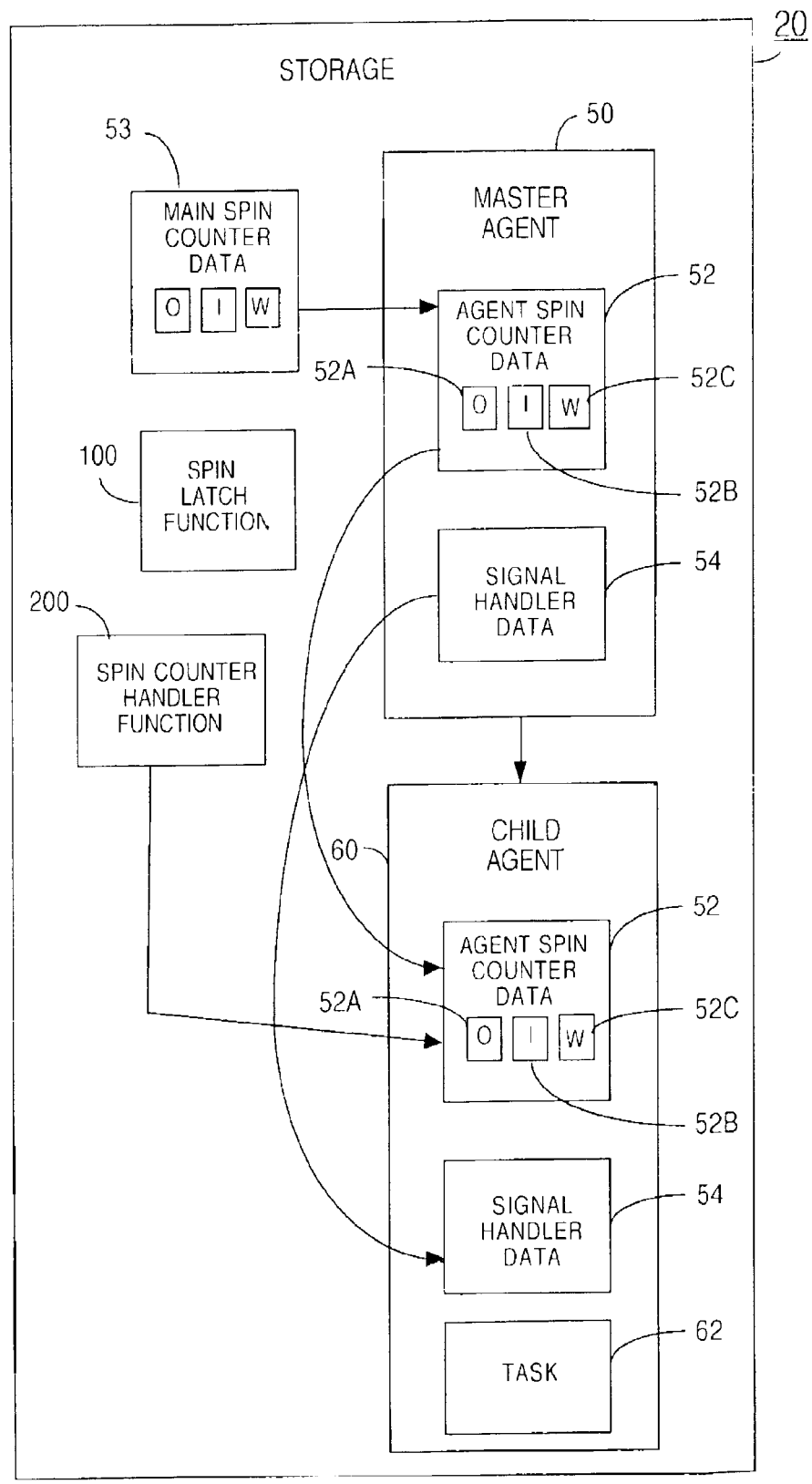
FIG. 2 is a schematic diagram of a Master Agent and Child Agents for use in the spin counter updating system of FIG. 1.

Referring now to FIG. 2, illustrated therein is storage 20 containing a master agent 50, which comprises spin counter data 52 and signal handler data 54. The master agent spin counter data 52 comprises outer value data 52A, inner value data 52B and waste value data 52C (preferably all positive integers), as will be discussed in greater detail below. The memory storage 20 includes a file containing corresponding main spin counter value data 53. Upon initialization of the computing system 10, the main spin counter value data 53 is copied to the master agent spin counter data 52.

The master agent 50 is used as a template in the creation of child agents 60 as each new process is initiated by the DBMS 30. As a result, each child agent 60 includes spin counter data 52' and signal handler data 54' which has been copied from and corresponds to the respective data 52, 54 stored in the master agent 50. In large systems 10, it is not uncommon for thousands of child agents 60 (each of which is assigned a unique process identifier) to be active at any instance of time. The master 50 and child 60 agents form part of the spin latch updating module 32.

Child agents 60 also contain software 62 (which may vary from one agent 60 to the next) programmed to accomplish a particular task. The agent 60 also typically stores context word data corresponding to register values and other data, which is used to initialize the registers not depicted if the child agent commences execution on a CPU 18, and which is updated after each context switch following processing by a CPU 18. As child agent 60 is created, a link to the child agent 60 using its unique process identifier is stored on the run queue 28, and the child agent 60 awaits access to a CPU 18 for processing.

As noted previously, when a child agent 60 is executing on a CPU 18 it may request access (via the operating system 22) to an exclusive resource (e.g. database records 24 in storage 20). Typically, an agent 60 attempts to "lock" the resource (that is, prevent other agents from accessing the locked resource). In the event that the resource is already being used by another agent 60, the lock attempt fails. In order to prevent a context switch, the use of spin latches is introduced. Spin latches cause the CPU 18 to "spin" or loop in accordance with predetermined spin counter values, while periodically checking to determine if a desired resource has become available.

By way of illustration, FIG. 3 shows pseudo-code for a spin latch function executed by a CPU 18, referred to generally as 300, for a child agent 60 during processing. Using looping structures, the function 300 cycles through a predetermined number of attempts to lock a particular resource (referred to as "resource name"), before a context switch is initiated and the CPU 18 is yielded to another agent 60 listed in sequenced order with other agents in the run queue 28. The values (also known as variables) for the outer, inner and waste loops, namely outer value 52A', inner value 52B' and waste value 52C', control the manner in which the spin latch function 100 operates, as will be described below.

Turning now to the signal handler data 54, 54', as will be understood the signal handler data 54, 54' contains software code which can be activated by the operating system 22 to interrupt and take control of the processing of the agent 60. For example, a suitably programmed signal handler can be used to terminate or "kill" an agent, and remove it from the run queue. The master agent spin counter signal handler 54 and the spin counter signal handler 54' for each child agent is uniquely registered with the operating system 22 (much like a serial number associated with an item).

In the case of the signal handler data 54, 54' of the present invention, FIG. 4 illustrates in pseudo-code a spin counter signal handler function, referred to generally as 400, designed to modify the child agent spin counter data 52'. As will be understood, if the operating system 22 activates the signal handler 54 or 54' for a specific agent 50 or 60, the signal handler function 400 causes the CPU 18 on which the signal handler 54 or 54' is executing, to retrieve the main spin counter value data 53 from the memory storage 20, and store it in the spin counter value storage 52, 52' for the corresponding agent 50, 60.

As will be appreciated, the embodiment of the present invention facilitates the dynamic adjustment of the spin counter values (52A, 52B, 52C, 52A', 52B', 52C') of the master agent 50 and all child agents 60. If an administrator of the system 10 determines that the performance of the system 10 may be improved by adjusting the spin counter values (52A, 52B, 52C, 52A', 52B', 52C'), the administrator can store the updated spin counter value data in the main spin counter value storage 53. As will be understood, the administrator then requests the operating system 22 to initiate a signal call to trigger the signal handler 54, 54' for the master agent 50 and all child agents 60, thereby updating the spin counter values (52A, 52B, 52C, 52A', 52B', 52C'), without the need to shut down and reinitialize the database management system 30 with the new spin counter values.

Figure 5:
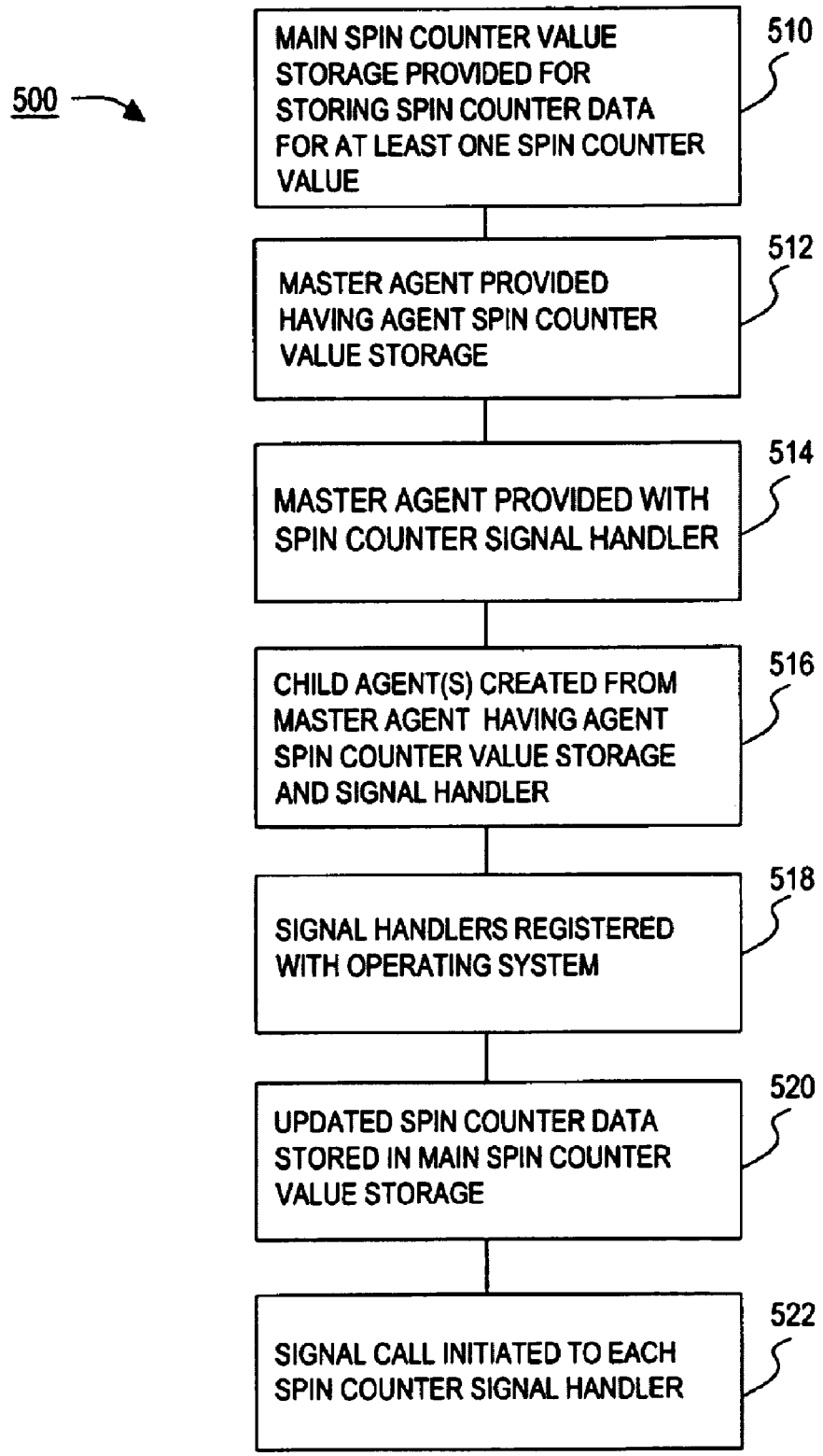
FIG. 5 is a flow chart of the steps of a method for updating spin counters.

FIG. 5 illustrates the operations of the method 500 for updating spin counters for spin latches 100 in a multiprocessor computing system 10. A main spin counter value storage 53 is provided for storing spin counter data correlated to at least one spin counter value. (Block 510) A master agent 50 is also provided having agent spin counter value storage 52 for storing spin counter data 52A, 52B, 52C correlated to spin counter values. (Block 512) The master agent 50 is also provided with a spin counter signal handler 54 which is adapted to receive a signal call from the operating system 22. Upon receiving a signal call, the spin counter signal handler 54 is adapted to read spin counter data from the main spin counter value storage 53 and to store the read spin counter data to the agent spin counter value storage. (Block 514)

As a process is initiated by the DBMS 30, a child agent 60 is created, using the master agent 50 as a template. Each such child agent 60 includes the spin counter signal handler 54' which is copied from the master agent signal handler 54.

(Block 516) The signal handler 54' for each child agent 60 (as well as the signal handler 54 for the master agent 50) is registered with the operating system 22. (Block 518) Upon determining that the spin counter values 52, 52' should be updated (typically for the purpose of optimizing system performance), the system administrator may then store the updated spin counter data in the main spin counter value storage 53. (Block 520) The administrator then requests the operating system 22 to initiate a signal call to each spin counter signal handler 54, 54' to cause each to update its respective agent spin counter values 52, 52' (as described in relation to FIG. 4). (Block 522)

Thus, while what is shown and described herein constitutes preferred embodiments of the subject invention, it should be understood that various changes can be made without departing from the subject invention, the scope of which is defined in the appended claims.

The embodiments of the invention in which an exclusive property or privilege is claimed are defined as follows:

1. A spin counter updating system for updating spin counters for spin latches in a multiprocessor computing system, the updating system comprising:
   (a) main spin counter value storage for storing spin counter data correlated to at least one spin counter value;
   (b) a master agent comprising:
      (i) agent spin counter value storage for storing spin counter data correlated to at least one spin counter value; and
      (ii) a spin counter signal handler, wherein the spin counter signal handler is adapted to read spin counter data from the main spin counter value storage and to store the read spin counter data to the agent spin counter value storage wherein the spin counter data is for counting.

2. The updating system of claim 1, wherein the spin counter signal handler is configured to respond to a signal call and to read the spin counter data from the main spin counter value storage and to store the read spin counter data to the agent spin counter value storage.

3. The spin counter updating system of claim 1 operatively coupled to a database management system.

4. The updating system of claim 1, wherein the spin counter data comprises outer loop data, inner loop data and waste loop data.

5. A method of updating spin counters for spin latches in a multiprocessor computing system, the method comprising the following steps:
   (a) providing a main spin counter value storage for storing spin counter data correlated to at least one spin counter value;
   (b) providing a master agent comprising:
      (i) agent spin counter value storage for storing spin counter data correlated to spin counte values; and
      (ii) a spin counter signal handler, wherein the spin counter signal handler is adapted to receive a signal call, and wherein upon receiving a signal call, the spin counter signal handler is adapted to read spin counter data from the main spin counter value storage and to store the read spin counter data to the agent spin counter value storage;
   (c) creating at least one child agent from the master agent wherein the child agent comprises the spin counter signal handler;
   (d) storing updated spin counter data in the main spin counter value storage; and
   (e) initiating a signal call to each spin counter signal handler wherein the spin counter data is for counting.

6. A computer program product in a computer readable medium for updating spin counters for spin latches in a multiprocessor computing system, wherein the computer readable medium has a computer readable program, wherein the computer readable program, when executed on the multiprocessor computing system, causes the multiprocessor computing system to:
   provide a main spin counter value storage for storing spin counter data correlated to at least one spin counter value;
   provide a master agent including:
      agent spin counter value storage for storing spin counter data correlated to spin counter values; and
      a spin counter signal handler, wherein the spin counter signal handler is adapted to receive a signal call, and wherein upon receiving a signal call, the spin counter signal handler is adapted to read spin counter data from the main spin counter value storage and to store the read spin counter data to the agent spin counter value storage;
   create at least one child agent from the master agent wherein the child agent comprises the spin counter signal handler;
   store updated spin counter data in the main spin counter value storage; and
   initiate a signal call to each spin counter signal handler wherein the spin counter data is for counting.

7. The computer program product according to claim 6, wherein the spin counter signal handler is configured to respond to a signal call and to read the spin counter data from the main spin counter value storage and to store the read spin counter data to the agent spin counter value storage.

8. The computer program product according to claim 6 wherein a given child agent from the at least one child agent is associated with a process initiated by a database management system.

9. The computer program product according to claim 6, wherein the spin counter data comprises outer loop data, inner loop data and waste loop data.

10. The system of claim 1, wherein the master agent is a template used to create child agents, the system further comprising:
    a child agent created from the master agent, wherein the child agent includes a child agent spin counter value storage that stores the spin counter data, a child agent spin counter signal handler, and software that is configured to access a resource.

11. The system of claim 10, wherein responsive to the software attempting to access the resource and the resource being locked, the child agent initiates a latch function executing one or more nested loops using the spin counter data stored in the child agent spin counter value storage.

12. The system of claim 10, wherein the child agent spin counter signal handler is configured to respond to a signal call and to read the spin counter data from the main spin counter value storage and to store the read spin counter data to the child agent spin counter value storage.

13. The system of claim 12, wherein the spin counter data comprises an outer loop counter, an inner loop counter, and a waste loop counter.

14. The method of claim 5, wherein the spin counter signal handler is configured to respond to a signal call and to read the spin counter data from the main spin counter value storage and to store the read spin counter data to the agent spin counter value storage.

15. The method of claim 5, wherein a given child agent from the at least one child agent is associated with a process initiated by a database management system.

16. The method of claim 5, wherein the spin counter data comprises an outer loop counter, an inner loop counter, and a waste loop counter.

17. The method of claim 5, wherein a given child agent within the at least one child agent includes software that is configured to access a resource.

18. The method of claim 17, wherein responsive to the software attempting to access the resource and the resource being locked, initiating a latch function executing one or more nested loops using the spin counter data stored in the child agent spin counter value storage.

19. The computer program product of claim 6, wherein a given child agent within the at least one child agent includes software that is configured to access a resource.

20. The computer program product of claim 19, wherein responsive to the software attempting to access the resource and the resource being locked, the given child agent initiates a latch function executing one or more nested loops using the spin counter data stored in the child agent spin counter value storage.

* * * * *